(12) United States Patent
Sato et al.

(10) Patent No.: US 8,461,248 B2
(45) Date of Patent: Jun. 11, 2013

(54) RESIN COMPOSITION AND MOLDED PRODUCT THEREOF, AND METHOD FOR THEIR PRODUCTION

(75) Inventors: Noritaka Sato, Kanagawa (JP); Yuya Aoki, Tokyo (JP); Tsutomu Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 12/720,865

(22) Filed: Mar. 10, 2010

(65) Prior Publication Data

US 2010/0240820 A1   Sep. 23, 2010

(30) Foreign Application Priority Data

Mar. 17, 2009   (JP) ................. 2009-064518

(51) Int. Cl.
*C08L 67/00*   (2006.01)
*C08L 31/00*   (2006.01)

(52) U.S. Cl.
USPC ........................................ 524/513; 524/533

(58) Field of Classification Search
USPC ....................................... 524/513
See application file for complete search history.

(56) References Cited

U.S. PATENT DOCUMENTS

| 2005/0014870 A1 | 1/2005 | Sato |
| 2006/0167134 A1 | 7/2006 | Sato |
| 2006/0247340 A1 | 11/2006 | Sato |
| 2009/0005475 A1 | 1/2009 | Sato |
| 2010/0093888 A1* | 4/2010 | Endo et al. ............ 523/124 |
| 2010/0227963 A1* | 9/2010 | Hironaka et al. ......... 524/451 |

FOREIGN PATENT DOCUMENTS

| EP | 1983030 | 10/2008 |
| EP | 2096142 | 9/2009 |
| EP | 2116576 | 11/2009 |
| JP | 2004352908 A  * | 12/2004 |
| JP | 2005-264147 | 9/2005 |
| JP | 2005-272679 | 10/2005 |
| JP | 2006-089587 | 4/2006 |
| JP | 2006-307036 | 11/2006 |
| JP | 4019414 | 12/2007 |
| WO | 2004/022649 | 3/2004 |
| WO | 2004/069932 | 8/2004 |
| WO | WO2008102919 | 8/2008 |

OTHER PUBLICATIONS

Translation of JP2004-352908, Dec. 2004.*
European Search Report corresponding to European Serial No. 10000991.9 dated Apr. 13, 2010.

* cited by examiner

*Primary Examiner* — Hui Chin
(74) *Attorney, Agent, or Firm* — Dentons US LLP

(57) ABSTRACT

A resin composition includes: a polylactic acid resin; an impact-resistant resin which is superior in impact resistance to the polylactic acid resin and is incompatible with or hardly compatible with the polylactic acid resin; and a nucleating agent which promotes crystallization of the polylactic acid resin; the nucleating agent existing at least in the phase of the impact-resistant resin.

9 Claims, 6 Drawing Sheets

DISTRIBUTION OF NUCLEATING AGENT

CRYSTALLIZATION OF POLYLACTIC ACID RESIN

⟨COMPARATIVE EXAMPLE I⟩

⟨COMPARATIVE EXAMPLE II⟩

<PHOTOGRAPH 1>

⟨PHOTOGRAPH 2⟩

100nm

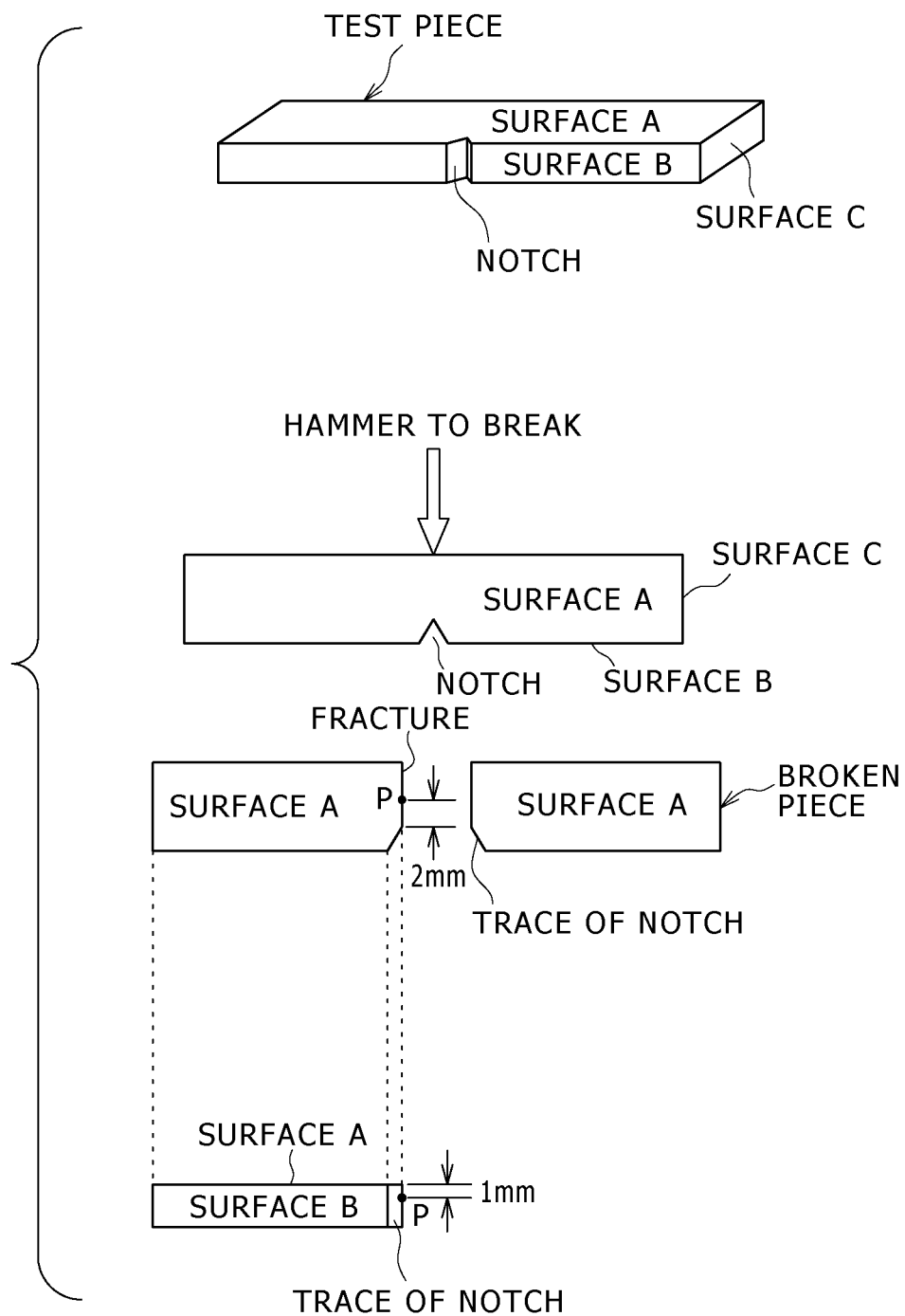

RESIN COMPOSITION AND MOLDED PRODUCT THEREOF, AND METHOD FOR THEIR PRODUCTION

BACKGROUND OF THE INVENTION

1. Field of the Invention

The present invention relates to a resin composition composed mainly of polylactic acid resin, molded product thereof, and a method for their production.

2. Description of the Related Art

Related synthetic resins have been produced mostly from fossil resources such as petroleum, coal, and natural gas. They have a strong fear in their near future that fossil resources as their raw material will be exhausted soon, they accumulate in the natural world without decomposition after disposal, and their incineration emits carbon dioxide that causes global warming.

This notion has aroused a keen interest in biomass plastics which are produced from plants and microorganisms in place of fossil resources. Their raw materials are never exhausted because they originate from carbon dioxide in the atmospheric air through photosynthesis. In addition, biomass plastics are decomposed in the natural world and have less possibility of accumulating in the natural world without decomposition after disposal. Their incineration does not increase the concentration of carbon dioxide in the atmospheric air because they simply exist as carbon dioxide and are just temporarily used as biomass plastics, and then returned to the cycle of carbon in nature.

Among biomass plastics is polylactic acid resin, which is superior in processability and mechanical properties and available more easily and inexpensively than any other biomass plastics because it is being commercially produced. Polylactic acid resin finds use, on account of its biodegradability, as industrial materials, machine parts, medical care products, and such products as net, film, and sheet for agriculture, fishing, and civil engineering. It also finds use in applications which need impact strength.

Those which are used as a structural material for, say, enclosures of electric appliances need a high impact strength such that they hardly crack at room temperature (about 25° C.). The property which hardly cracks at about 25° C. means that the impact strength at about 25° C. is equivalent to an Izod impact strength or Charpy impact strength greater than about 10 kJ/m$^2$. Those resins having such impact strengths usually have a glass transition point (Tg) no higher than 0° C. This will be described in the following.

The glass transition point is defined as the temperature at which polymeric substances, such as synthetic resins and natural rubber, which have a glass transition point, undergo glass transition. Any substance with a glass transition point has an amorphous moiety in which the intramolecular rotation of polymer chains is bound to frozen by intermolecular forces at a low temperature for molecular thermal motion to remain inactive. This state is called glass state. On the other hand, at a high temperature for active molecular motion, the intramolecular rotation of polymer chains overcomes the binding by the intermolecular force between polymer chains. This state is called rubber state. The glass transition point is a temperature in which the state transfers from glass state to rubber state. When the resin is heated to be higher than its glass transition point, any resin becomes capable of deformation but retains its original shape unless it is given a deforming force. This is the difference between glass transition point and melting point (or the temperature at which crystals melt).

Most of general purpose resins usually have a flexural modulus of elasticity equal to or greater than 1000 MPa at their temperature equal to or below their glass transition point; however, the flexural modulus of elasticity is lower than 1000 MPa at the temperature equal to or higher than their glass transition point. Eventually they assume a rubbery state, which is not suitable for use as a structural material for enclosures, for example.

Now, the polylactic acid resin can be used as a structural material for enclosures because it has a glass transition point of about 60° C. and its molded product has a flexural modulus of elasticity of about 2000 MPa at room temperature. However, it is as vulnerable to cracking as polystyrene because it is poor in impact resistance, with its Charpy impact strength being about 2 kJ/m$^2$. It needs improvement in impact resistance if it is to be used as a structural material for enclosures of portable appliances.

As one way of improving polylactic acid resin in impact strength, polymer blending and polymer alloying to form a composite material composed of polylactic acid resin and another resin having higher impact strength than polylactic acid resin have been known. Resins suitable for combination with polylactic acid resin are those which have a flexural modulus of elasticity equal to or lower than 300 MPa at 30° C. Examples of such resins include polybutylene succinate, polybutylene succinate adipate, polybutylene terephthalate, polymer of aliphatic polyester of polylactic acid, polyamide, acrylonitrile-butadiene-styrene copolymer. Incidentally, any resin having a higher impact resistance than polylactic acid resin may be referred to as rubber henceforth in this specification.

In addition to the foregoing, the polylactic acid resin to be used as a structural material for enclosures of electric appliances should have an adequate modulus of elasticity at about 80° C. The polylactic acid resin is a polymer that takes on the crystalline structure. If any molded product of polylactic acid resin has a low ratio of crystallinity at room temperature, it will considerably soften and deform at temperatures above the glass transition point (about 60° C.) of the polylactic acid resin. It is known that the polylactic acid resin has an adequate modulus of elasticity at about 80° C. if it is crystallized and it has a certain degree of crystallinity. A possible way proposed so far of crystallizing the polylactic acid resin is by heat treatment during or after molding.

However, there is a problem that crystallization of polylactic acid resin takes a long time. In fact, polylactic acid resin takes a much longer time for crystallization than ordinary molding cycle, which is about one minute for injection molding. Therefore, if polylactic acid resin is to be crystallized completely in the mold, injection molding takes such a long time as to greatly reduce efficiency. In-mold crystallization is not practicable. Also, a longer cycle means that the polylactic acid which has been hot melted for the subsequent cycle in the cylinder of the injection molding machine experiences an extended heat history. This results in heat deterioration of polylactic acid resin and degradation of its molded products in mechanical properties, especially impact resistance. Moreover, crystallization of polylactic acid resin in the usual way gives rise to crystals of the order of microns to submicrons in size, and such large crystals scatter light, making polylactic acid resin white turbid and opaque.

In order to address this problem or in order to promote crystallization, attention has been turned to the addition of a so-called nucleating agent. The crystal nucleating agent becomes the primary crystal nucleus of a crystalline polymer and promotes the crystal growth of a crystalline polymer. In a broad sense, it includes one which promotes crystallization of a crystalline polymer. It also includes one which accelerates the rate of crystallization of a polymer. The former crystal nucleating agent makes fine the crystals of a polymer, thereby improving the polymer's stiffness and clarity. Both of the crystal nucleating agents can accelerate the rate of crystallization, thereby reducing time required for crystallization and also reducing the molding cycle time if molding and crystallization proceed simultaneously.

Examples of the efficient nucleating agent for polylactic acid resin include a metal salt of phosphonic acid having an aromatic ring (see Japanese Patent Laid-open No. 2006-89587 (claims etc.)) and a salt of melamine compound (see Japanese Patent Laid-open No. 2005-272679 (claims etc.)). Additional examples include polycyclic pigments and azo pigments (see Japanese Patent No. 4019414 (claims etc.), International Publication Nos. WO2004/022649 (claims etc.) and WO2004/069932 (claims etc.), and Japanese Patent Laid-open Nos. 2005-264147 (claims etc.) and 2006-307036 (claims etc.)).

SUMMARY OF THE INVENTION

It is desirable to provide a resin composition composed of a polylactic acid resin, a resin superior in impact resistance to the polylactic acid resin, and a nucleating agent to promote crystallization of the polylactic acid resin, the resin composition containing crystallized polylactic acid resin in a larger portion and having a higher impact resistance; a molded product of the resin composition; and a method for production of the resin composition and molded product.

Any resin composition composed of a polylactic acid resin and a resin (rubber) which is superior in impact resistance to said polylactic acid resin and is incompatible with said lactic acid resin forms the so-called sea-island structure, in which the polylactic acid constitutes the sea and the rubber constitutes the islands if the former dominates over the latter in volume. However, the present inventors found that this is not the case if the resin composition is incorporated with a crystallizing agent that promotes crystallization of the polylactic acid resin and that the crystallizing agent exists in either the phase of the polylactic acid resin or the phase of the resin (rubber) superior in impact resistance to the polylactic acid depending on its kind.

After investigation into this phenomenon, the present inventors found that the resin composition improves in impact resistance when the crystallizing agent exists in the resin (rubber) phase superior in impact resistance. This finding led to the present invention.

That is, a form of the present invention is concerned with a resin composition which is composed of a polylactic acid resin, an impact-resistant resin which is superior in impact resistance to the polylactic acid resin and is incompatible or hardly compatible with the polylactic acid resin, and a nucleating agent to promote crystallization of the polylactic acid resin, with the nucleating agent existing at least in the phase of the impact-resistant resin. The form is concerned also with a molded product of the resin composition.

Moreover, another form of the present invention provides a method for producing a resin composition, the method including melt-mixing together a polylactic acid resin, an impact-resistant resin which is superior in impact resistance to the polylactic acid resin and is incompatible or hardly compatible with the polylactic acid resin, and a nucleating agent to promote crystallization of the polylactic acid resin, in such a way that the nucleating agent exists at least in the phase of the impact-resistant resin. The form also provides a method for producing a molded product in a prescribed form by melting from the resin composition which has been produced as mentioned above.

Incidentally, the term "the nucleating agent existing at least in the phase of the impact-resistant resin" in the forms of the present invention means not only that all of the nucleating agent is unevenly distributed in the phase of the impact-resistant resin (particularly in the thermal equilibrium state) but also that substantially most of the nucleating agent exists in the phase of the impact-resistant resin and part of the nucleating agent exists in the phase of the polylactic acid resin. The latter case tends to occur in the thermal nonequilibrium state. It is desirable that more than 90% (by volume) of the nucleating agent should exist in the phase of the impact resistant resin and less than 10% (by volume) of the nucleating agent should exist in the phase of the polylactic acid resin.

In practice, the ratio of the nucleating agent existing in the phase of the impact-resistant resin should be controlled basically by selecting an adequate nucleating agent according to its polarity and molecular structure which is favorable to compatibility with the impact-resistant resin but incompatible or hardly compatible with the polylactic acid resin. For the nucleating agent to fully achieve crystallization of the polylactic acid resin, it is desirable that at least part of the nucleating agent in the phase of the impact-resistant resin should be in contact with the phase of the polylactic acid resin (in other words, it should face the phase of the polylactic acid resin at the interface between the phase of the impact-resistant resin and the phase of the polylactic acid resin).

The resin composition according to the forms of the present invention is composed of a polylactic acid resin, an impact-resistant resin (rubber) which is superior in impact resistance to the polylactic acid resin, and a nucleating agent to promote crystallization of the polylactic acid resin, with the nucleating agent existing at least in the phase of the impact-resistant resin, so that the polylactic acid resin crystallizes in a large ratio and improves in impact resistance.

BRIEF DESCRIPTION OF THE DRAWINGS

FIG. 6 shows a perspective view, plan view, and front view illustrating the molded product (test piece) of the resin composition and the method for impact test.

DETAILED DESCRIPTION OF THE PREFERRED EMBODIMENT

Figure 1A:
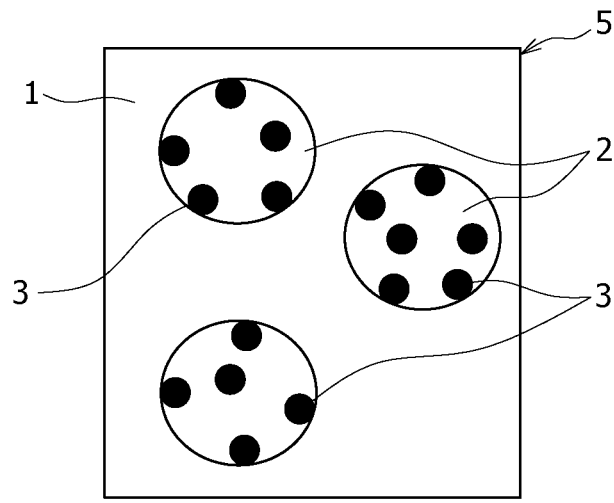
FIG. 1A is a schematic diagram showing the structure of the resin composition according to one embodiment of the present invention.

Items relating to the present invention are explained in the following.

<Polylactic Acid>

Polylactic acid resin (which may be also described as polylactic acid below) used in the present invention can be produced by any known method, such as lactide method, polycondensation of a polyhydric alcohol with a polybasic acid, and intermolecular polycondensation of hydroxycarboxylic acid having a hydroxyl group and a carboxyl group in the molecule.

Polylactic acid can be obtained usually by so-called lactide method, which is based on ring-opening polymerization of lactide (such as a cyclic diester) or a lactone corresponding to it. Another method is direct dehydration condensation of lactic acid. Production of an aliphatic polyester of polylactic acid needs a catalyst such as tin, antimony, zinc, titanium, iron, and aluminum compound. A tin- or aluminum-based catalyst is preferable, such as tin octylate and aluminum acetylacetonate.

Poly L-lactic acid obtained by lactide ring-opening polymerization is most appropriate among all kinds of polylactic acid, because it is readily hydrolyzable into L-lactic acid and is proven to be safe. The polylactic acid used in the present invention is not limited to poly L-lactic acid, and the lactide used for its production is not limited to that of L form either.

The polylactic acid used in the present invention should preferably have a molecular weight from 100,000 to 1,000,000 and also have an optical purity higher than 80%, more desirably higher than 90%, most desirably higher than 97%.

The polylactic acid to be used in the present invention may be commercially available one, such as "Raycia" (from Mitsui Chemicals, Inc.), "U'z" (from Toyota Motor Corporation), and "Nature Works" (from Nature Works LLC).

<Resin Superior in Impact Resistance to Polylactic Acid>

The following is a description of the resin (rubber) to be used in the present invention, which is superior in impact resistance to the polylactic acid resin.

Impact resistance should be determined from Charpy or Izod impact resistance at room temperature (about 25° C.). The resin which is superior in impact resistance to the polylactic acid resin used in the present invention should preferably be one which has Charpy or Izod impact resistance greater than 3 kJ/m$^2$ measured according to JIS K-7111 (ISO 179) or JIS K-7110 (ISO 180) stipulating respectively the method for measuring Charpy impact strength of plastics or Izod impact resistance of plastics.

The resin (or impact-resistant resin) which is superior in impact resistance to the polylactic acid resin used in the present invention should preferably be one which has a flexural modulus of elasticity no higher than 300 MPa at 30° C.

In addition, the impact-resistant resin should preferably be one which has a glass transition point no higher than 0° C., which is measured according to JIS K-7122 stipulating the method for measuring the heat of transition of plastics.

The impact-resistant resin that can be used in the present invention is typically at least on species selected from the group consisting of polybutylene succinate, polybutylene succinate adipate, polybutylene terephthalate, polybutylene adipate terephthalate, polymer of aliphatic polyester of polylactic acid, copolymer of polylactic acid and diol-dicarboxylic acid, polyamide resin, acrylonitrile-butadiene-styrene copolymer, polyethylene resin, and polypropylene resin. Preferable among these resins are polybutylene succinate, polybutylene adipate terephthalate, and copolymer of polylactic acid and diol-dicarboxylic acid. The acrylonitrile-butadiene-styrene copolymer should preferably be one which has a high butadiene content so that it exhibits a flexural modulus of elasticity no higher than 300 MPa at 30° C. This requirement will be met by properly adjusting the ratio of the three constituents.

The foregoing impact-resistant resin should account for 5 to 50 mass %, preferably 10 to 30 mass %, more preferably 15 to 25 mass %, in the total amount of the resin composition, depending on its kind. An amount less than 5 mass % is not enough to produce sufficient impact resistance. An amount more than 50 mass % is not enough for the resin composition of the present invention to have heat resistance. Moreover, an amount more than 50 mass % results in a resin composition with insufficient polylactic acid resin, which is undesirable from the standpoint of environmental load and hence is contrary to the desire of the present invention. However, if the foregoing impact-resistant resin is derived partly from plants (for example, it is composed of a polyester as the polymer component and a biodegradable product of polylactic acid as the additional component), the plant-derived portion may be regarded as the polylactic acid. In such a case, the resin composition should contain less than 50 mass % of petroleum-based resin (such as polyester).

<Nucleating Agent to Promote Crystallization of Polylactic Acid Resin>

The nucleating agent to promote crystallization of polylactic acid may be any known substance so long as it promotes crystallization of polylactic acid resin.

The amount of the nucleating agent in the resin composition should be 0.01 to 10 mass %, preferably 0.1 to 5 mass %, more preferably 0.5 to 2 mass %. Too small an amount leads to insufficient crystallization of polylactic acid, and too large an amount makes the polylactic acid composition poor in impact resistance and heat resistance.

In the case where the nucleating agent is added only to the polylactic acid resin, the resulting resin composition should give a DSC (differential scanning calorimetry) curve with a peak in the range of 100 to 150° C. at which the enthalpy of heat generation is larger than 23 J/g per unit mass of the polylactic acid resin, assuming that DSC is carried out at a temperature descending rate of 180° C. to 20° C./min. If this requirement is not met, the nucleating agent does not fully produce its effect of promoting crystallization and hence the polylactic acid resin will take a long time for crystallization.

<Additives>

The resin composition according to the present invention is composed of the impact-resistant resin (preferably in an amount of 5 to 50 mass %) and the nucleating agent (preferably in an amount of 0.01 to 10 mass %), with the remainder being substantially the polylactic acid, as mentioned above. However, it may optionally contain a variety of other additives such as flame retardant, colorant, hydrolysis inhibitor, lubricant, wax, heat stabilizer, reinforcement, inorganic and organic fillers, antioxidant, and ultraviolet light absorber.

The amount of those other additives is preferably no less than 0.1 mass % and no more than 50 mass % of the resin component, although not specifically restricted. An amount less than 0.1 mass % makes it too small to produce the desired effect of the additives, and an amount more than 50 mass % makes the resin composition of the present invention poor in properties such as heat resistance, moldability, and impact resistance.

The flame retardant includes those of metal oxides, phosphorus compounds, boron compounds, inorganic compounds, nitrogen compounds, halogen compounds, organic compounds, and colloid compounds. The flame retardant should be one which does not become load for the environment in disposal, such as one emitting no toxic gas at the time of incineration.

Those flame retardants which are preferable from the standpoint of environmental protection include hydroxide compounds (such as aluminum hydroxide, magnesium hydroxide, and calcium hydroxide), and phosphorus compounds, particularly, ammonium phosphate compounds (such as ammonium phosphate and ammonium polyphosphate), and silica compounds (such as silicon dioxide, low-melting glass, and organosiloxane). They may be used alone or in combination with one another.

Examples of coloring agents include inorganic pigments, organic pigments, and dyes. These pigments may be added for coloring according to need.

Polylactic acid is a hydrolyzable resin. It is subject to hydrolysis by moisture in air, and it gradually decreases in molecular weight as hydrolysis proceeds. Decreased molecular weight aggravates mechanical properties such as impact resistance and heat resistance. Therefore, it should be protected against hydrolysis, and hence it should be incorporated with a hydrolysis inhibitor.

The hydrolysis inhibitor includes, for example, carbodiimide compounds, isocyanate compounds, and oxazoline compounds. A carbodiimide compound is particularly preferable because it can be incorporated into a polylactic acid by melt mixing and its incorporation in a small quantity prevents hydrolysis of the polylactic acid.

A carbodiimide compound is a compound which has at least one carbodiimide group in the molecule, and it also includes polycarbodiimide compounds. Monocarbodiimide compounds, which included in carbodiimide compounds, include dicyclohexylcarbodiimide, diisopropylcarbodiimide, dimethylcarbodiimide, diisobutylcarbodiimide, dioctylcarbodiimide, diphenylcarbodiimide, and naphthyl-carbodiimide. Preferable among these examples are dicyclohexylcarbodiimide and diisopropylcarbodiimide which are commercially available.

Examples of isocyanate compounds include 2,4-tolylenediisocyanate, 2,6-tolylenediisocyanate, m-phenylenediisocyanate, p-phenylenediisocyanate, 4,4'-diphenylmethanediisocyanate, 2,4'-diphenylmethanediisocyanate, 2,2'-diphenylmethanediisocyanate, 3,3'-dimethyl-4,4'-biphenylenediisocyanate, 3,3'-dimethoxy-4,4'-biphenylenediisocyanate, 3,3'-dichloro-4,4'-biphenylenediisocyanate, 1,5-naphthalenediisocyanate, 1,5-tetrahydronaphthalenediisocyanate, tetramethylenediisocyanate, 1,6-hexamethylenediisocyanate, dodecamethylenediisocyanate, trimethylhexamethylenediisocyanate, 1,3-cyclohexylenediisocyanate, 1,4-cyclohexylenediisocyanate, xylylenediisocyanate, tetramethylxylylenediisocyanate, hydrogenated xylylenediisocyanate, lysinediisocyanate, isohoronediisocyanate, 4,4'-dicyclohexylmethanediisocyanate, and 3,3'-dimethyl-4,4'-dicyclohexylmethanediisocyanate.

Examples of oxazoline compounds include 2,2'-o-phenylenebis(2-oxazoline), 2,2'-m-phenylenebis(2-oxazoline), 2,2'-p-phenylenebis(2-oxazoline), 2,2'-p-phenylenebis(4-methyl-2-oxazoline), 2,2'-m-phenylenebis(4-methyl-2-oxazoline), 2,2'-p-phenylenebis(4,4'-dimethyl-2-oxazoline), 2,2'-m-phenylenebis(-4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-ethylenebis(4-methyl-2-oxazoline), and 2,2'-diphenylenebis(2-oxazoline).

The hydrolysis inhibitor mentioned above can be readily produced by any known method and any commercial one can be used. An example of commercially available one is carbodiimide from Nisshin Boseki under a trade name of "Carbodilite."

The hydrolysis inhibitor used in the present invention causes the resin composition to hydrolyze at varied rates depending on its kind and amount added. The kind and amount of the hydrolysis inhibitor to be added should be properly adjusted according to objective products. Specifically, the amount of the hydrolysis inhibitor for the total amount of the resin composition should be no more than about 5 mass %, preferably no more than about 1 mass %. The hydrolysis inhibitors mentioned above may be used alone or in combination with one another.

Examples of lubricants are listed below. Petroleum lubricating oil (such as liquid paraffin), synthetic lubricating oil (such as halogenated hydrocarbon, diester oil, silicone oil, and fluorosilicone), modified silicone oil (such as epoxy-modified one, amino-modified one, alkyl-modified one, and polyether-modified one), silicone-based lubricating oil (such as polyoxyalkylene glycol, which is a copolymer of silicone with an organic compound), silicone copolymer, fluorine-based surfactant (such as fluoroalkyl compound), fluorine-based lubricant (such as trifluoromethylene chloride oligomer), wax (such as paraffin wax and polyethylene wax), higher aliphatic alcohol, higher aliphatic amide, higher aliphatic ester, higher fatty acid salt, and molybdenum disulfide.

Preferable among the foregoing examples is silicone copolymer (formed by block- or graft-copolymerization of silicone with a resin).

Preferred silicone copolymers are block- or graft-copolymer of silicone with any of acrylic resin, polystyrene resin, polynitrile resin, polyamide resin, polyolefin resin, epoxy resin, polybutyral resin, melamine resin, vinyl chloride resin, polyurethane resin, and polyvinyl ether resin. Silicone graft copolymers are preferable.

The lubricants listed above may be used alone or in combination with one another.

Examples of waxes include olefin wax (such as polypropylene wax and polyethylene wax), paraffin wax, fishertropush wax, microcrystalline wax, montan wax, aliphatic amide wax, higher aliphatic alcohol wax, higher aliphatic acid wax, aliphatic ester wax, carnauba wax, and rice wax.

The waxes listed above may be used alone or in combination with one another.

Heat stabilizers include, for example, nitrogen-containing compounds such as basic nitrogen-containing compounds (such as polyamide, poly-β-alanine copolymer, polyacrylamide, polyurethane, melamine, cyanoguanidine, and melamine-formaldehyde condensate), metal salt of organic carboxylic acid (such as calcium stearate and calcium 12-hydroxystearate), metal oxides (such as magnesium oxide, calcium oxide, and aluminum oxide), metal hydroxide (such as magnesium hydroxide, calcium hydroxide, and aluminum hydroxide), alkali metal-containing compound and alkaline earth metal-containing compounds (such as metal carbonate), zeolite, and hydrotalcite.

Preferable among the foregoing examples are alkali metal-containing compounds and alkaline earth metal-containing compounds (particularly magnesium compounds and calcium compounds), zeolite, and hydrotalcite.

The heat stabilizers mentioned above may be used alone or in combination with one another.

The reinforcement material includes, for example, microglass beads, fiber (such as plant fiber and glass fiber), silicate (such as chalk, quartz such as novoculite, asbestos, feldspar, mica, talc, and wollastonite), and kaolin.

The inorganic filler includes, for example, carbon, silicon dioxide, metal oxide fine particles (such as alumina, silica, magnesia, and ferrite), silicate (such as talk, mica, kaolin, and zeolite), barium sulfate, calcium carbonate, silicide (such as silicon nitride and silicon carbide), boride (such as carbon boride and nitrogen boride), fine particles (such as fullerene), and whiskers of calcium carbide, potassium titanate, calcium silicate, and aluminum borate.

The organic filler includes, for example, epoxy resin, melamine resin, urea resin, acrylic resin, polycarbonate resin, phenolic resin, polyimide resin, polyamide resin, polyester resin, and Teflon (registered trademark).

Carbon, silicon dioxide, and silicide are particularly suitable. The above-mentioned fillers may be used alone or in combination with one another.

The antioxidant includes those of phenol type, amine type, phosphorus type, sulfur type, hydroquinone type, and quinoline type.

Phenolic antioxidants are hindered phenols, such as 2,6-di-t-butyl-p-cresol, 1,3,5-trimethyl-2,4,6-tris(3,5-di-t-butyl-4-hydroxybenzyl)benzene, 2,2'-methylenebis(4-methyl-6-t-butylphenol), 4,4'-methylenebis(2,6-di-t-butylphenol), 4,4'-butylidenebis(3-methyl-6-t-butylphenol), and 1,6-hexanediol-bis[3-(3,5-di-t-butyl-4-hydroxyphenyl) propionate, which are categorized as $C_{2-10}$ alkylenediol-bis [3-(3,5-di-branched $C_{3-6}$ alkyl-4-hydroxyphenyl) propionate]; triethyleneglycol-bis[3-(3-t-butyl-5-methyl-4-hydroxyphenyl)propionate], which is categorized as di- or trioxy $C_{2-4}$ alkylenediol-bis[3-(3,5-di-branched $C_{3-6}$ alkyl-4-hydroxyphenyl)propionate]; glycerinetris[3-(3,5-di-t-butyl-4-hydroxyphenyl)propionate], which is categorized as $C_{3-8}$ alkanetriol-bis[3-(3,5-di-branched $C_{3-6}$ alkyl-4-hydroxyphenyl)propionate]; pentaerythritoltetrakis[3-(3,5-di-t-butyl-4-hydroxyphenyl)propionate], which is categorized as $C_{4-8}$ alkanetetraoltetrakis[3-(3,5-di-branched $C_{3-6}$ alkyl-4-hydroxylphenyl)propionate]; and n-octadecyl-3-(4',5'-di-t-butylphenol)propionate, n-octadecyl-3-(4'-hydroxy-3',5'-di-t-butylphenol)propionate, stearyl-2-(3,5-di-t-butyl-4-hydroxyphenol)propionate, distearyl-3,5-di-t-butyl-4-hydroxybenzylphoshonate, 2-t-butyl-6-(3-t-butyl-5-methyl-2-hydroxybenzyl)-4-methylphenylacrylate, N,N'-hexamethylenebis(3,5-di-t-butyl-4-hydroxy-hydrocinamide), 3,9-bis{2-[3-(3-t-butyl-4-hydroxy-5-methylphenyl)propionyloxy]-1,1-dimethylethyl}-2,4,8,10-tetraoxaspiro[5,5]undecane, 4,4'-thiobis(3-methyl-6-t-butylphenol), and 1,1,3-tris(2-methyl-4-hydroxy-5-t-butylphenol)butane.

Amine-based antioxidants include phenyl-1-napthylamine, phenyl-2-naphthylamine, N,N'-diphenyl-1,4-phenylenediamine, and N-phenyl-N'-cyclohexyl-1,4-phenylenediamine.

Phosphorus-based antioxidants include phosphite compounds, such as triisodecyl phosphite, triphenyl phosphite, trisnonylphenyl phosphite, diphenylisodecyl phosphite, phenyldiisodecyl phosphite, 2,2-methylenebis(4,6-di-t-butylphenyl)octyl phosphite, 4,4'-butylidenebis(3-methyl-6-t-butylphenyl)ditridecyl phosphite, tris(2,4-di-t-butylphenyl) phosphite, tris(2-t-butyl-4-methylphenyl)phosphite, tris(2,4-di-t-amylphenyl)phosphite, tris(2-t-butylphenyl)phosphite, bis(2-t-butylphenyl)phenyl phosphite, tris[2-(1,1-dimethylpropyl)-phenyl]phosphite, tris[2,4-(1,1-dimethylpropyl)-phenyl]phosphite, tris(2-cyclohexylphenyl)phosphite, and tris(2-t-butyl-4-phenylphenyl)phosphite; and phosphine compounds, such as triethylphosphine, tripropylphosphine, tributylphosphine, tricyclohexylphosphine, diphenylvinylphosphine, allyldiphenylphosphine, triphenylphosphine, methylphenyl-p-anisylphosphine, p-anisyldiphenylphosphine, p-tolyldiphenylphosphine, di-p-anisylphenylphosphine, di-p tolylphenylphosphine, tri-m-aminophenylphosphine, tri-2,4-dimethylphenylphosphine, tri-2,4,6-trimethylphenylphosphine, tri-o-tolylphosphine, tri-m-tolylphosphine, tri-p-tolylphosphine, tri-o-anisylphosphine, tri-p-anisylphosphine, and 1,4-bis(diphenylphosphino)butane.

Hydroquinone-based antioxidants include 2,5-di-t-butyl-hydroquinone.

Quinoline-based antioxidants include, for example, 6-ethoxy-2,2,4-trimethyl-1,2-dihydroquinoline.

Sulfur-based antioxidants include, for example, dilaurylthiopropionate and distearylthiodipropionate.

Preferable among the above-mentioned antioxidants are phenolic antioxidants, particularly hindered phenols, such as polyol-poly[(branched $C_{3-6}$ alkyl group- and hydroxyl group-substituted phenyl)propionate].

The above-mentioned antioxidants may be used alone or in combination with one another.

Ultraviolet light absorbers include known ones of benzophenone, benzotriazole, cyanoacrylate, salicylate, and oxalic anilide.

Their specific examples are listed below. [2-hydroxy-4-(methacryloyloxyethoxy)benzophenone]-methyl methacrylate copolymer, [2-hydroxy-4-(methacryloyloxymethoxy)benzophenone]-methyl methacrylate copolymer, [2 hydroxy-4-(methacryloyloxyoctoxy)benzophenone]-methyl methacrylate copolymer, [2-hydroxy-4-(methacryloyloxy-dodecyloxy)benzophenone]-methyl methacrylate copolymer, [2-hydroxy-4-(methacryloyloxybenzyloxy)benzophenone]-methyl methacrylate copolymer, [2,2'-dihydroxy-4-(methacryloyloxyethoxy)]benzophenone]-methyl methacrylate copolymer, [2,2'-dihydroxy-4-(methacryloyloxymethoxy)benzophenone]-methyl methacrylate copolymer, and [2,2'-dihydroxy-4-(methacryloyloxyoctoxybenzophenone)-methyl methacrylate copolymer.

The ultraviolet light absorbers mentioned above may be used alone or in combination with one another.

<Various Kinds of Treatment>

The resin composition of the present invention may undergo any one of known treatments.

For example, for protection of polylactic acid from hydrolysis, the resin composition may be irradiated with active energy rays, such as electromagnetic waves, electron beams, and particle rays, and combination thereof.

The resin composition of the present invention will find use in the areas of moldings. Typical application areas include molded enclosures of electric appliances exemplified by audio visual (AV) equipment of stand alone type (such as digital video disc (DVD) player, compact disc (CD) player, and amplifier), speakers, on-vehicle AV equipment, on-vehicle information telecommunication (IT) equipment, cellphone unit, portable information terminal (PDA) (such as electronic books), video cassette recorder, television, projector, television receiver, digital video camera, digital still camera, printer, radio, radio cassette, system stereo, microphone, headphone, keyboard, portable music instrument (such as headphone stereo), personal computer, and peripherals of personal computer.

Incidentally, the resin composition according to the present invention may be applied to not only enclosures of electric appliances but also parts and packaging materials for electric appliances. Some of them are listed below. A water-proof case (so-called marine case) that encloses a nonwaterproof digital camera, thereby allowing its use in an environment of water splash. Enclosures for storage and transportation of electric equipment. Information recording media such as optical disc (LD, CD, DVD, HD-DVD (registered trademark), Blu-ray Disc (registered trademark), MiniDisc (registered trademark), and optomagnetic disc. Casing (or so-called jewel case) to store them. Needless to say, the resin composition according to the present invention can be applied to information recording media by molding and to automotive interior finishing.

The resin composition of the present invention may be made into moldings by blow molding, film formation, extrusion molding, injection molding, and the like. Injection molding is particularly desirable.

Specifically, extrusion molding may be accomplished in the usual way by using any known extrusion molding machine, such as single-screw extruder, multi-screw extruder, and tandem extruder.

Also, injection molding may be accomplished in the usual way by using any known injection molding machine, such as in-line screw injection molding machine, multi-layer injection molding machine, and two-head injection molding machine.

Applications of molded products of resin composition include dynamo, motor, transformer, current transformer, voltage regulator, rectifier, inverter, relays, electric power contact, switch, breaker, electric parts (such as knife switch, multiple pole rod, cabinet, light socket, terminal boards, plug, and power module), sensor, light-emitting diode (LED) lamp, connector, resistor, relay case, small switch, coil bobbin, capacitor, variable capacitor case, optical pickup, oscillator, transducer, printed circuit board, tuner, speaker, microphone, head phone, storage device (such as floppy disc (registered trademark) (FD) and magneto-optical disc), small motor, magnetic head base, semiconductor, liquid crystal, FD drive carriage, FD drive chassis, printers (such as ink jet printer or thermal transfer printer), printer ink case, motor brush holder, parabolic antenna, computer-related electronic parts, VTR parts, television parts, enclosures of electric or electronic machines (such as television and personal computer), home electronics or office appliance parts (such as iron, hair dryer, rice boiler parts, electronic oven parts, audio equipment, audio equipment parts (such as audio disc, laser disc, and compact disc), illumination parts, refrigerator parts, air conditioner parts, typewriter parts, and word processor parts), office computer parts, telephone parts, facsimile parts, copying machine parts, machine-related parts (such as cleaning jig, motor parts, lighter and typewriter parts), optical apparatus or precision instrument-related parts (such as microscope, binocular, camera and watch), automobile and vehicle-related parts (such as alternator terminal, alternator connector, integrated circuit (IC) regulator, potentiometer base for light dayer, various valves such as exhaust gas valve, various pipes for fuel, exhaust and intake, air intake nozzle snorkel, intake manifold, fuel pump, engine coolant joint, carburetor main body, carburetor spacer, exhaust gas sensor, coolant sensor, oil temperature sensor, brake pad wear sensor, throttle position sensor, crank shaft position sensor, air flow meter, brake pad wear sensor, air conditioner thermostat base, heating air flow control valve, radiator motor brush holder, water pump impeller, turbine vane, wiper motor parts, distributor, starter switch, starter relay, transmission wire harness, window washer nozzle, air conditioner panel switch board, coil of magnetic valve for fuel supply, fuse connector, horn terminal, insulating plates for electric equipment, step motor rotor, lamp socket, lamp reflector, lamp housing, brake piston, solenoid bobbin, engine oil filter, ignition system casing, and other automotive parts) and packaging materials.

Moreover, applications include machine mechanism parts such as gear, gear shaft, bearing, rack, pinion, cam, crank and crank arm, and wheel.

Other applications include automotive parts and their packaging materials, such as on-vehicle electric and electronic equipment mentioned above, alternator terminal, alternator connector, IC regulator, light dayer potentiometer base, various valves such as exhaust gas valve, various pipes for fuel, exhaust and intake, air intake nozzle snorkel, intake manifold, fuel pump, engine coolant joint, carburetor main body, carburetor spacer, exhaust gas sensor, coolant sensor, oil temperature sensor, brake pad wear sensor, throttle position sensor, crankshaft position sensor, air flow meter, brake pad wear sensor, air conditioner thermostat base, heater air flow control valve, radiator motor brush holder, water pump impeller, turbine vane, wiper motor parts, distributor, starter switch, starter relay, transmission wire harness, wind washer nozzle, air conditioner switch board, coil of magnetic valve for fuel supply, fuse connector, horn terminal, insulating plates for electric equipment, step motor rotor, lamp socket, lamp reflector, lamp housing, brake piston, solenoid bobbin, engine oil filter, and ignition system casing.

The preferred embodiment of the present invention will be described below with reference to the accompanying drawings.

FIG. 1A is a schematic diagram showing the structure of the resin composition 5 according to one embodiment of the present invention. As shown in FIG. 1A, it is noted that the phase 1 of the polylactic acid resin is separated from the phase 2 of the resin (such as polybutylene adipate terephthalate) which is superior in impact resistance to the polylactic acid resin and is incompatible with the polylactic acid resin. It is also noted that copper phthalocyanine (of α-form, β-form, ε-form among its polymorphic forms; any form would be available) as the nucleating agent 3 to promote crystallization of the polylactic acid resin is compatible with the phase 2 of the resin which is superior in impact resistance to the polylactic acid resin 1, and at the time of melt mixing (mentioned later) it becomes unevenly distributed in the phase 2 of the resin which is superior in impact resistance to the polylactic acid resin.

Figure 1B:
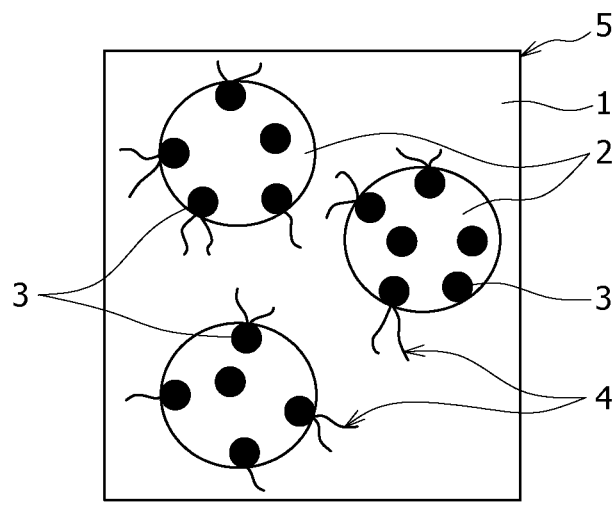
FIG. 1B is a schematic diagram showing the state of crystallization of the polylactic acid resin.

At the time of molding that follows melt-mixing (mentioned later), crystallization 4 of the polylactic acid resin proceeds at the interface between the phase of polylactic acid resin 1 and the phase of impact-resistant resin 2 by the effect of the nucleating agent 3 facing the phase of polylactic acid resin 1 as shown in FIG. 1B. Eventually, the phase of polylactic acid resin 1 crystallizes sufficiently. At the same time, the resin composition 5 increases in impact resistance owing to the impact-resistant resin 2.

Figure 2A:
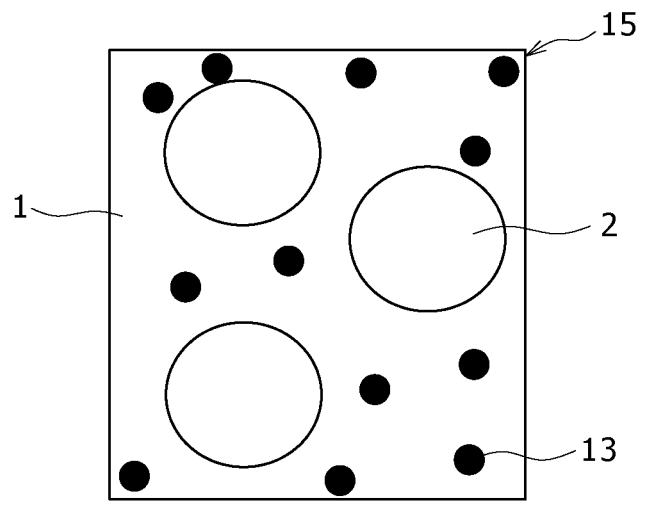
FIGS. 2A and 2B show schematic diagrams showing the structure of the resin composition according to comparative examples.
Figure 2B:
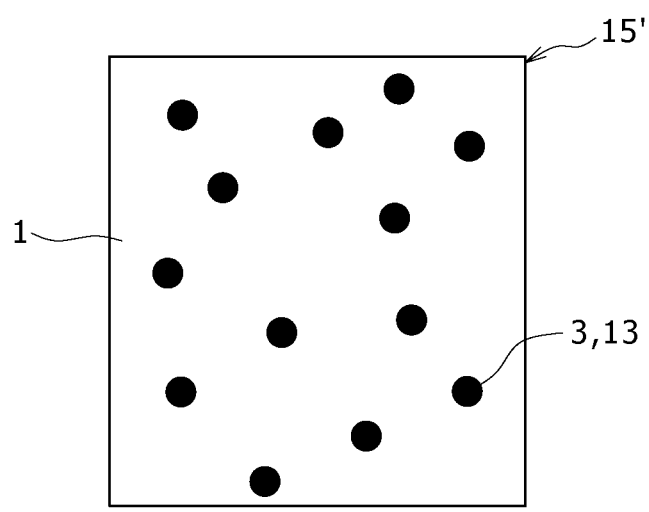

FIGS. 2A and 2B are schematic diagrams showing the structure of the resin compositions 15 and 15' according to comparative examples for comparison with the resin composition 5 shown in FIGS. 1A and 1B. The resin compositions in these comparative examples are incorporated with a monoazo dye (color index generic name pigment yellow 191) as the nucleating agent 13 to promote crystallization of the polylactic acid resin. This nucleating agent is compatible with the polylactic acid resin and hence is unevenly distributed in the phase of the polylactic acid resin 1 (in Comparative Example I). The resin composition without the impact-resistant resin 2 is examined in Comparative Example II.

Specimens for impact test were taken from the resin compositions 5 and 15, which are shown in FIGS. 1A and 1B, and FIG. 2A (for comparative example I), respectively. The results of their Izod impact test show that impact resistance is higher for the resin composition 5 (with its structure shown in FIGS. 1A and 1B) than the resin composition 15 (with its structure shown in FIG. 2A).

Figure 3:
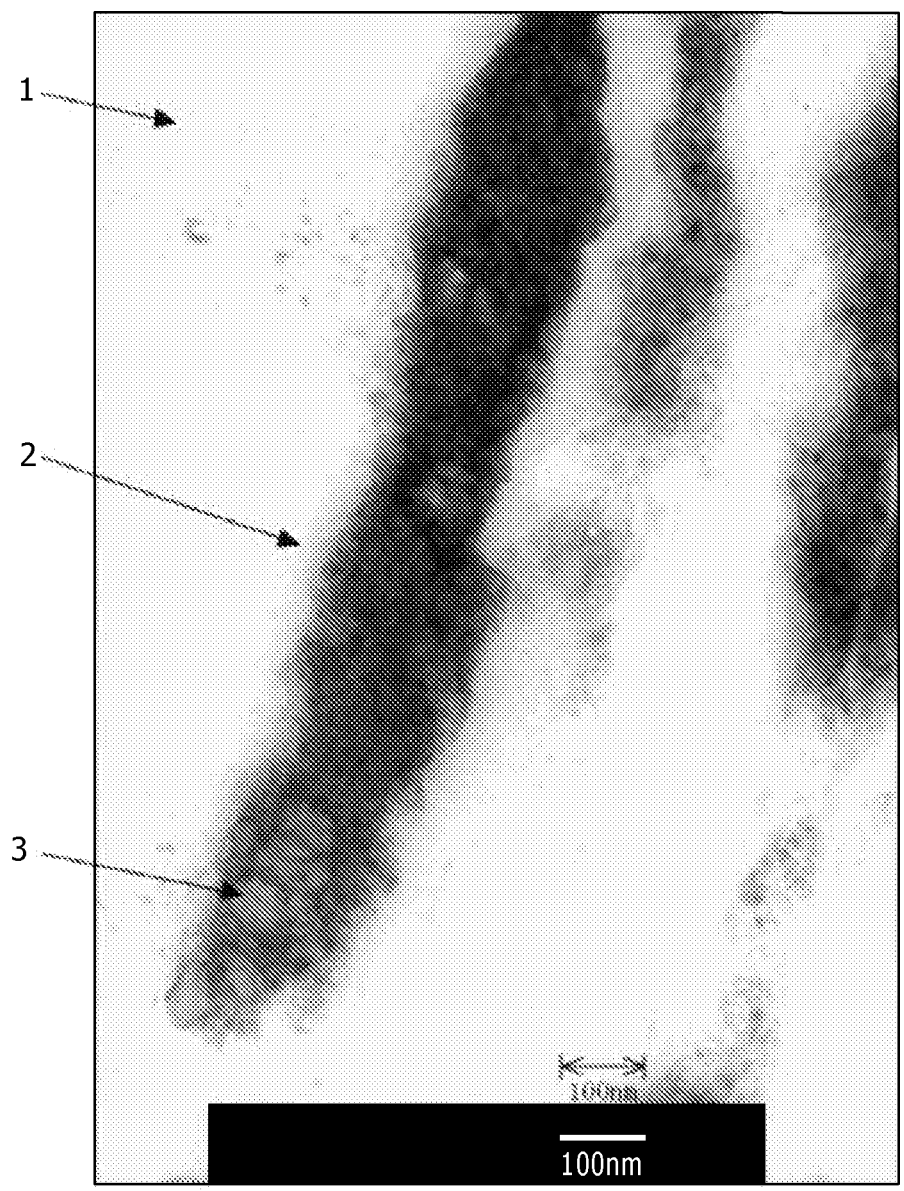
FIG. 3 is an electron micrograph of the resin composition according to Example 1 of the present invention which was taken after molding but before impact test.

The resin composition (with its structure shown in FIG. 1A) was examined under an electron microscope. An electron micrograph 1 taken for a dyed thin section is shown in FIG. 3. In this figure, the dark part (or the island phase) represents the resin 2 superior in impact resistance to the polylactic acid resin 1. (In this case, the resin 2 is a copolymer of polylactic acid and aliphatic diol-aliphatic dicarboxylic acid.) The figure apparently shows that the particles of the nucleating agent 3 (copper phthalocyanine) are unevenly distributed in the resin 2 superior in impact resistance to the polylactic acid resin 1.

The following describes Examples and Comparative Examples which demonstrate the practical application of the resin composition according to the present invention.

<Preparation of Resin Composition>

In Example 1, a resin composition was prepared from the following components.

Polylactic acid resin: "Lacea H100" from Mitsui Chemicals Inc.

Resin (rubber) superior in impact resistance to the polylactic acid resin: "Plamate PD-150" from DIC Corporation, which is a copolymer of polylactic acid and aliphatic diol-aliphatic dicarboxylic acid.

Nucleating agent to promote crystallization of the polylactic acid resin: Copper phthalocyanine highly compatible with the rubber component. "IRGALITE Blue GBP, PB15:3" from Ciba Specialty Chemicals. The copper phthalocyanine has the crystalline structure of β-type.

The polylactic acid and the copolymer (or rubber) of polylactic acid and aliphatic diol-aliphatic dicarboxylic acid mentioned above (both in pellet form) were mixed together in the ratio shown in Table 1 immediately after air drying at 80° C. for 12 hours. The resulting mixture was fed into a twin-screw mixer through a metering feeder. At the same time, the nucleating agent was also fed into the twin-screw mixer through another metering feeder. They underwent twin-screw mixing, or melt mixing, with heating. The metering feeders were adjusted so that the mixing ratio shown in Table 1 was achieved. The mixing conditions are shown below. Incidentally, the twin-screw mixer is ZE-40A made by Berstorff.
Screw diameter: 40 mm
Overall length: 1340 mm
Temperature: 200° C. uniformly throughout the entire length
Strand cooling: water
Screw rotating speed: 150 rpm
Main feeding rate: 15 or 25 kg/h Then, the mixed resin composition was cut into pellets for molding. The thus obtained resin composition was found that the nucleating agent was unevenly distributed in the phase of rubber at the time of melt-mixing because of its good compatibility.

<Preparation of Test Pieces>

Test pieces for Example 1 were prepared by injection molding under the following conditions from the resin composition (in pellet form) prepared as mentioned above and then air-dried at 80° C. for five hours. Injection molding machine: Model NEX500 (with a mold clamping pressure of 50 tons) made by Nissei plastic industrial
Mold: to form four test pieces each measuring 4×10×80 mm. (Two of them are notched for Charpy test.)
Cylinder temperature: 200° C. at nozzle, front, center, and rear
Mold temperature: 100 to 103° C. measured at mold surface by a contact thermometer. This temperature was maintained by adjusting the temperature of high-pressure hot water.

<Measurement of Heat Resistance>

The test pieces were examined for heat deflection temperature (HDT) according to JIS K-7191: Plastics-Determination of temperature of deflection under load, under a load of 0.45 MPa by using an HDT tester Model 6M-2 made by Toyo Seiki Seisaku-sho. The results are shown in Table 1.

<Measurement of Impact Resistance>

The test pieces were examined for Charpy impact strength according to JIS K-7111 (ISO 179): Plastics-Determination Charpy impact strength, by using a digital impact tester Model DG-CB made by Toyo Seiki Seisaku-sho. The results are shown in Table 1.

<Observation Under Electron Microscope>

A sample was taken from the test piece which had been left intact without impact test. Another sample was taken from the test piece which had undergone impact test. The sampling position is indicated by "P" in FIG. 6. It is on the fracture surface and 2 mm away from the notch end and 1 mm away from the surface A toward the surface B. Each sample was embedded in epoxy resin and dyed in bulk with $RuO_4$, and the dyed sample was cut into an ultrathin section (100 nm) for edge view in electron microscope observation by using an ultramicrotome.

Figure 4:
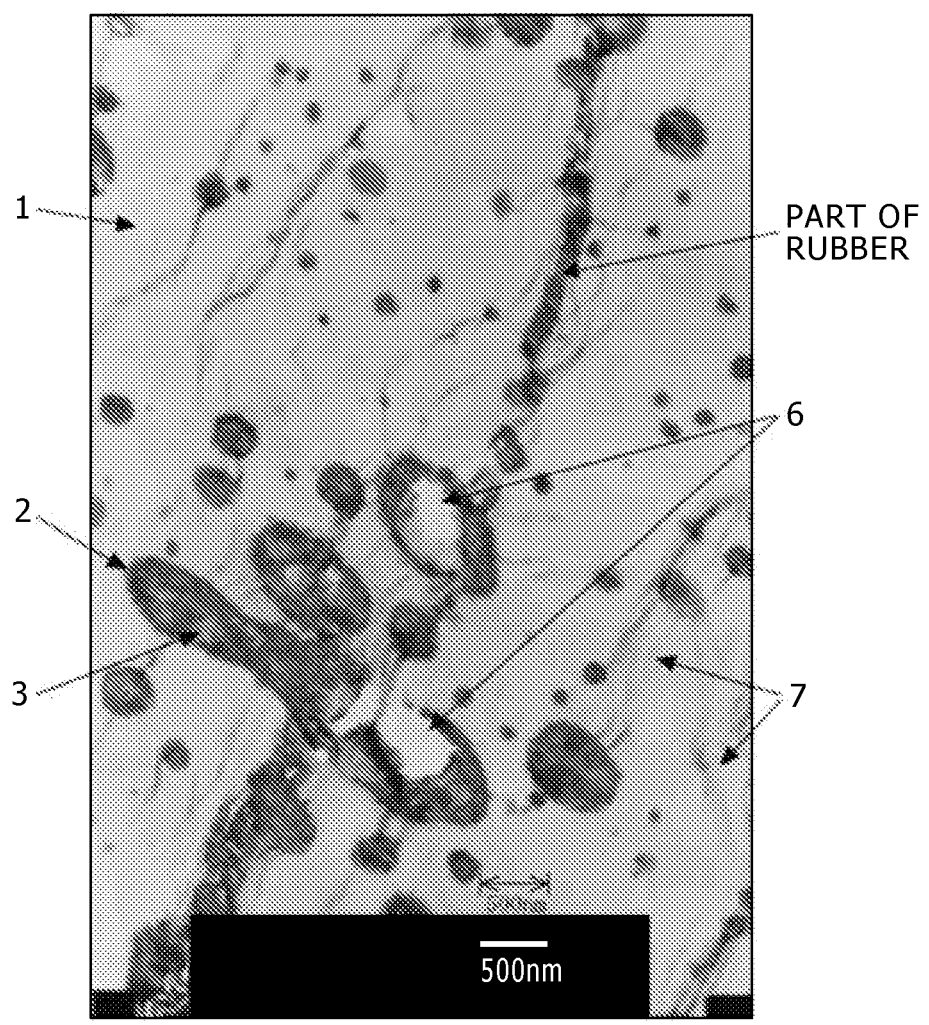
FIG. 4 is an electron micrograph of the resin composition according to Example 1 of the present invention which was taken after impact test that followed molding.

The ultrathin sections were observed under a transmission electron microscope (Model JEM1230 made by JEOL ltd.) with an accelerating voltage of 120 kV. The results are shown in FIGS. 3 and 4. Photograph 1 in FIG. 3 was taken before impact test, and photograph 2 in FIG. 4 was taken after impact test. As explained above, it is noted from photograph 1 that the impact-resistant resin (rubber) 2 had been elongated at the time of molding. It also noted from photograph 2 that there are many crazes or cracks 7 in the phase 1 of polylactic acid (sea) and that the nucleating agent 3 (copper phthalocyanine) exists in the phase 2 of rubber (islands) and cavitations (voids) 6 occur due to partial breakage of the rubber 2 by impact. This is because the impact-resistant rubber phase extends to absorb impact energy at the instance of impact in the impact test, thereby giving rise to cavitations to release the absorbed energy. This is attributable to the improved impact resistance.

EXAMPLE 2

The resin composition for Example 2 was prepared in the same way as in Example 1 except that the copper phthalocyanine was replaced by the same amount of uracil (from Kyowa Hakko) compatible with the rubber component and the resin composition was incorporated with one part by weight of polycarbodiimide ("Carbodilite" HMV-8CA, from Nisshinbo Holdings Inc.) as a hydrolysis inhibitor. The raw materials according to the formulation shown in Table 1 underwent twin-screw mixing, or melt mixing, as in Example 1.

Figure 5:
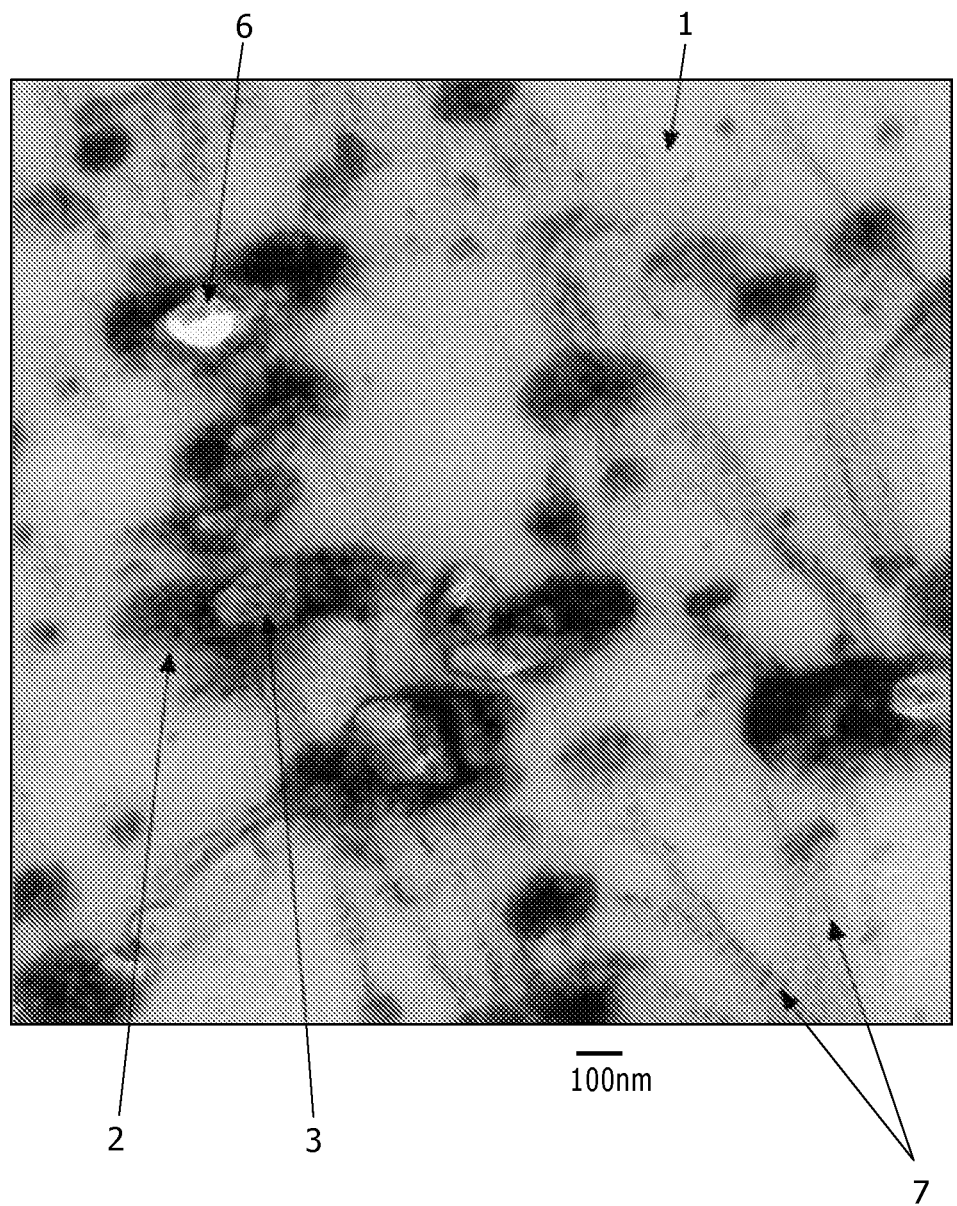
FIG. 5 is an electron micrograph of the resin composition according to Example 2 of the present invention which was taken after impact test that followed molding.

Additionally, a test piece is molded so that the resin composition was examined for physical properties in the same way as in Example 1. The results are shown in Table 1. The electron micrograph of the test piece which had been broken after impact test is shown in FIG. 5 (photograph 3). The comment on observation is the same as that in Example 1.

EXAMPLE 3

Preparation of Resin Composition

A resin composition for Example 3 was prepared in the same way as in Example 1 according to the formulation shown in Table 1, except that the copolymer of polylactic acid and aliphatic diol-aliphatic dicarboxylic acid was replaced by polybutylene terephthalate adipate ("Ecoflex" from BASF Japan).

<Preparation of Test Pieces>

Test pieces for Example 3 were prepared by injection molding under the following conditions from the resin composition (in pellet form) prepared as mentioned above and then heat air-dried at 80° C. for five hours.

Injection molding machine: Model F40, made by Klockner
Mold: to form test pieces each measuring 3.1×13×127 mm
Cylinder temperature: 200° C. at nozzle, front, center, and rear
Mold temperature: 100 to 103° C. measured at mold surface by a contact thermometer. This temperature was maintained by adjusting the power of the electric heater.

<Measurement of Heat Resistance>

The test pieces were examined for heat deflection temperature in the same way as in Example 1, with a load of 0.45 MPa applied in the edgewise direction. The results are shown in Table 1.

<Measurement of Impact Resistance>

The injection-molded product mentioned above was given a notch by machining and the resulting test piece was examined for Izod impact strength according to JIS K-7110 (ISO 180): Plastics-Determination of Izod impact strength, by using an impact tester (made by Toyo Seiki Seisaku-sho) in the same way as in Example 1. The results are shown in Table 1. Incidentally, the data of Izod impact strength is expressed in terms of converted unit for convenient comparison with that of Charpy impact strength.

<Observation Under Electron Microscope>

The test pieces for Example 3 were observed under an electron microscope in the same way as in Example 1.

EXAMPLE 4

The resin composition was prepared in the same way as in Example 1 according to the formulation shown in Table 1, except that it was incorporated with one part by weight of polycarbodiimide compound ("Carbodilite" HMV-8CA, from Nisshinbo Holdings Inc.) as a hydrolysis inhibitor.

The resin composition was examined for physical properties by molding test pieces, in the same way as in Example 1. The results are shown in Table 1.

EXAMPLE 5

The resin composition for Example 5 was prepared according to the formulation shown in Table 1 by repeating the same procedure as in Example 1 except that the amount of the nucleating agent was changed to 0.1 part by weight.

The resin composition was examined for properties by molding test pieces, in the same way as in Example 1. The results are shown in Table 1.

EXAMPLE 6

The resin composition for Example 6 was prepared according to the formulation shown in Table 1 by repeating the same procedure as in Example 3 except that the amount of the nucleating agent was changed to 0.1 part by weight.

The resin composition was examined for physical properties by molding test pieces, in the same way as in Example 3. The results are shown in Table 1.

Comparative Example 1

The resin composition for Comparative Example 1 was prepared in the same way as in Example 1 except that the copper phthalocyanine for Example 1 was replaced by Color Index Generic Name Pigment Yellow 191 ("PV Fast Yellow HGR" from Clariant Japan) which is highly compatible with polylactic acid.

The resin composition was examined for physical properties by molding test pieces, in the same way as in Example 1. The results are shown in Table 1.

Comparative Example 2

The resin composition for Comparative Example 2 was prepared by repeating the same procedure as in Example 1 except that the resin superior in impact resistance to the polylactic acid resin was not used. The polylactic acid resin is "Lacea H100 (from Mitsui Chemicals Inc.)." The nucleating agent to promote crystallization of the polylactic acid resin is copper phthalocyanine ("Irgalite Blue GBP" from Ciba Specialty Chemicals).

The resin composition was examined for physical properties by molding test pieces, in the same way as in Example 1. The results are shown in Table 1.

Comparative Example 3

The same procedure as in Comparative Example 2 was repeated to prepare the resin composition for Comparative Example 3 except that the nucleating agent was replaced by uracil (from Kyowa Hakko Kogyo).

The resin composition was examined for physical properties by molding test pieces, in the same way as in Comparative Example 2. The results are shown in Table 1.

Comparative Example 4

The resin composition for Comparative Example 4 was prepared in the same way as in Comparative Example 2 except that copper phthalocyanine was replaced by Color Index Generic Name Pigment Yellow 191 ("PV Fast Yellow HGR" from Clariant Japan) as the nucleating agent to promote crystallization of the polylactic acid resin.

The resin composition was examined for physical properties by molding test pieces, in the same way as in Comparative Example 2. The results are shown in Table 1.

Comparative Example 5

The resin composition was prepared from the following components. It does not contain the nucleating agent to promote crystallization of polylactic acid resin.
  Polylactic acid resin: "Lacea H100" from Mitsui Chemicals Inc.
  Copolymer of polylactic acid and aliphatic diol-aliphatic dicarboxylic acid, which is superior in impact resistance to polylactic acid resin: "Plamate PD-150" from DIC Corporation Any attempt to form test pieces for Comparative Example 5 as in Example 1 failed due to deformation at the time of demolding.

Comparative Example 6

The resin composition for Comparative Example 6 was prepared from the following components in the same way as in Comparative Example 5, except that the copolymer of polylactic acid and aliphatic diol-aliphatic dicarboxylic acid for Comparative Example 5 was replaced by polybutylene terephthalate adipate ("Ecoflex" from BASF Japan). It does not contain the nucleating agent to promote crystallization of polylactic acid resin.

Any attempt to form test pieces for Comparative Example 6 as in Example 1 failed due to deformation at the time of demolding.

Comparative Example 7

The resin composition was prepared from polylactic acid resin alone, which is "Lacea H100" from Mitsui Chemicals, Inc. It contains neither the resin superior in impact resistance to the polylactic acid resin nor the nucleating agent to promote crystallization of the polylactic acid resin.

Any attempt to form test pieces for Comparative Example 7 as in Example 1 failed due to deformation at the time of demolding.

As mentioned above, the resin composition according to the present invention gives rise to a molded product with high impact resistance and good heat resistance because it is composed of a polylactic acid resin, a resin which is superior in impact resistance to the polylactic acid resin and is incompatible with the polylactic acid resin, and a nucleating agent which promotes crystallization of the polylactic acid resin, such that the nucleating agent exists at least in the phase of the resin superior in impact resistance.

The resin compositions and molded products thereof according to the present invention can help expand the usage of and contribute to spreading biodegradable polylactic acid resin by crystallizing polylactic acid resin sufficiently and improving the impact resistance of the molded products on

TABLE 1

| | Phase in which nucleating agent exists | Components (parts by weight) | | | | Physical properties | | Note |
|---|---|---|---|---|---|---|---|---|
| | | Polylactic acid | Rubber | Nucleating agent | Additive | Impact resistance (kJ/m$^2$) | HDT (°C.) | |
| Example 1 | Phase of rubber | Polylactic acid 71 parts | Plamate 29 parts | PB15:3 1 part | None | 10.4 | 83 | |
| Example 2 | Phase of rubber | Polylactic acid 71 parts | Plamate 29 parts | Uracil 1 part | Carbodiimide 1 part | 12.2 | 75 | |
| Example 3 | Phase of rubber | Polylactic acid 71 parts | Ecoflex 29 parts | PB15:3 1 part | None | 6.2 | 80 | |
| Example 4 | Phase of rubber | Polylactic acid 71 parts | Ecoflex 29 parts | PB15:3 1 part | Carbodiimide 1 part | 7.7 | 79 | |
| Example 5 | Phase of rubber | Polylactic acid 71 parts | Plamate 29 parts | PB15:3 0.1 part | None | 11.8 | 97 | |
| Example 6 | Phase of rubber | Polylactic acid 71 parts | Ecoflex 29 parts | PB15:3 0.1 part | None | 6.9 | 84 | |
| Comparative Example 1 | Phase of polylactic acid | Polylactic acid 71 parts | Plamate 29 parts | PY191 1 part | None | 3.1 | 79 | |
| Comparative Example 2 | Phase of polylactic acid | Polylactic acid 99 parts | None | PB15:3 1 part | None | 2.0 | 140 | |
| Comparative Example 3 | Phase of polylactic acid | Polylactic acid 99 parts | None | Uracil 1 part | None | 1.8 | 121 | |
| Comparative Example 4 | Phase of polylactic acid | Polylactic acid 99 parts | None | PY191 1 part | None | 1.9 | 116 | |
| Comparative Example 5 | — | Polylactic acid 71 parts | Plamate 29 parts | None | None | — | — | *1 |
| Comparative Example 6 | — | Polylactic acid 71 parts | Ecoflex 29 parts | None | None | — | — | *1 |
| Comparative Example 7 | — | Polylactic acid 100 parts | None | None | None | — | — | *1 |

*1 Test pieces were not available due to deformation at the time of demolding.

It is noted from Table 1 that the resin compositions and their molded products in Examples 1 to 6 are superior in impact resistance to those in Comparative Example 1. In the former case, the nucleating agent exists in the phase of rubber (or resin superior in impact resistance to polylactic acid resin). In the latter case, the nucleating agent exists in the phase of polylactic acid resin. Comparison between Examples 1 and 3 and Examples 5 and 6 indicates that impact resistance may remain large despite reduction of the nucleating agent. There is no substantial difference between Examples 1 to 6 and Comparative Example 1 in the value of HDT representing heat resistance.

The resin compositions and their molded products in Comparative Examples 2 to 4 are poor in impact resistance (2 kJ/m$^2$) because they do not contain rubber. The resin compositions in Comparative Examples 5 to 7, which do not contain the nucleating agent, gave no test pieces for evaluation of physical properties. Any attempt to form test pieces failed due to deformation at the time of demolding. This is because the polylactic acid was slow in crystallization and was hardly crystallized and the resulting resin composition was very low in modulus of elasticity.

composition of the polylactic acid resin and a resin superior in impact resistance to polylactic acid resin.

The present application contains subject matter related to that disclosed in Japanese Priority Patent Application JP 2009-064518 filed in the Japan Patent Office on Mar. 17, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A resin composition comprising:
   a polylactic acid resin;
   an impact-resistant resin which is superior in impact resistance to said polylactic acid resin and is incompatible with or hardly compatible with said polylactic acid resin; and
   a nucleating agent that promotes crystallization of said polylactic acid resin, wherein, said nucleating agent is compatible with said impact-resistant resin and exists at least in the phase of said impact-resistant resin, and the nucleating agent is copper phthalocyanine.

2. The resin composition as defined in claim 1, wherein said impact-resistant resin has a flexural modulus of elasticity not higher than 300 MPa at 30° C.

3. The resin composition as defined in claim 1, wherein said impact-resistant resin has a glass transition point not higher than 0° C.

4. The resin composition as defined in claim 1, wherein said impact-resistant resin is at least one species selected from the group consisting of polybutylene succinate, polybutylene succinate adipate, polybutylene terephthalate, polybutylene adipate terephthalate, polymer of aliphatic polyester of polylactic acid, copolymer of polylactic acid and diol-dicarboxylic acid, polyamide resin, acrylonitrile-buta-diene-styrene copolymer, polyethylene resin, and polypropylene resin.

5. The resin composition as defined in claim 1, wherein said impact-resistant resin accounts for 5 to 50 mass % in the total amount of the resin components of the resin composition and said nucleating agent accounts for 0.01 to 10 mass % of the resin composition, with the remainder being substantially said polylactic acid resin.

6. The resin composition as defined in claim 1, further comprising additives in an amount of 0.1 to 50 mass % of the resin composition.

7. A molded product formed from the resin composition, the resin composition including:

a polylactic acid resin;

an impact-resistant resin which is superior in impact resistance to said polylactic acid resin and is incompatible with or hardly compatible with said polylactic acid resin; and a nucleating agent that promotes crystallization of said polylactic acid resin, wherein said nucleating agent is compatible with said impact-resistant resin, and exists at least in the phase of said impact-resistant resin, and the nucleating agent is copper phthalocyanine.

8. A method for producing a resin composition, said method comprising the step of melt-mixing a polylactic acid resin, an impact-resistant resin that is superior in impact resistance to said polylactic acid resin and is incompatible with or hardly compatible with said polylactic acid resin, and a nucleating agent which promotes crystallization of said polylactic acid resin, said nucleating agent being compatible with said impact-resistant resin and existing at least in the phase of said impact-resistant resin, wherein the nucleating agent is copper phthalocyanine.

9. A method for producing a molded product, said method comprising the steps of:

melting a resin composition prepared by a method including the step of melt-mixing a polylactic acid resin, an impact-resistant resin that is superior in impact resistance to said polylactic acid resin and is incompatible with or hardly compatible with said polylactic acid resin, and a nucleating agent that promotes crystallization of said polylactic acid resin, said nucleating agent being compatible with said impact-resistant resin and existing at least in the phase of said impact-resistant resin; and forming the resulting melt into a desired shape, wherein the nucleating agent is copper phthalocyanine.

* * * * *